United States Patent
Thomas et al.

(10) Patent No.: US 7,221,722 B2
(45) Date of Patent: May 22, 2007

(54) METHOD AND APPARATUS FOR REDUCING INTERFERENCE WITHIN A COMMUNICATION SYSTEM

(75) Inventors: Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 352 days.

(21) Appl. No.: 10/375,438

(22) Filed: Feb. 27, 2003

(65) Prior Publication Data

US 2004/0184570 A1   Sep. 23, 2004

(51) Int. Cl.
*H03D 1/04* (2006.01)

(52) U.S. Cl. .................................................. 375/346

(58) Field of Classification Search ................ 375/285, 375/346–350, 147–148, 260, 267; 455/132, 455/135, 137, 134, 273, 273.1, 279.1, 63.1, 455/65, 67.13, 447, 296; 370/210, 335, 337, 370/347, 208, 343
See application file for complete search history.

(56) References Cited

U.S. PATENT DOCUMENTS

| | | | | |
|---|---|---|---|---|
| 5,481,570 A | * | 1/1996 | Winters | 375/347 |
| 5,867,478 A | | 2/1999 | Baum et al. | |
| 6,141,393 A | * | 10/2000 | Thomas et al. | 375/347 |
| 6,223,040 B1 | * | 4/2001 | Dam | 455/447 |
| 6,256,486 B1 | * | 7/2001 | Barany et al. | 455/296 |
| 6,351,499 B1 | * | 2/2002 | Paulraj et al. | 375/267 |
| 6,442,130 B1 | * | 8/2002 | Jones et al. | 370/208 |
| 6,512,738 B1 | * | 1/2003 | Namekata et al. | 370/210 |
| 6,597,678 B1 | * | 7/2003 | Kuwahara et al. | 370/342 |
| 6,636,729 B1 | * | 10/2003 | Hiramatsu et al. | 455/278.1 |
| 6,778,612 B1 | * | 8/2004 | Lozano et al. | 375/299 |
| 6,785,341 B2 | * | 8/2004 | Walton et al. | 375/267 |
| 6,813,263 B1 | * | 11/2004 | Margherita | 370/347 |
| 2001/0053143 A1 | * | 12/2001 | Li et al. | 370/344 |
| 2002/0085653 A1 | * | 7/2002 | Matsuoka et al. | 375/347 |
| 2002/0196734 A1 | * | 12/2002 | Tanaka et al. | 370/210 |

OTHER PUBLICATIONS

Li, Y.G.; Sollenberger, N.R.; "Adaptive Antenna Arrays for OFDM Systems With Cochannel Interference" IEEE Transactions on Communications vol. 47, No. 2 Feb. 1999.
Breinholt, M.B., Zoltowski, M.D. "Space-Time Processing for Maximum Frequency Reuse in OFDM Cellular Communications" Allerton 2002.

* cited by examiner

*Primary Examiner*—Khanh Tran

(57) ABSTRACT

A method for reducing interference within a communication system is provided herein. The method comprising the steps of receiving a signal y(n), where y(n) comprises a desired signal, s(n), and a co-channel interfering signal, i(n), wherein s(n) and i(n) are not time-synchronized, converting y(n) into a frequency-domain signal Y(k), calculating a weight vector W(k), wherein W(k) is based on s(n) and i(n), and additionally based on a time offset T existing between s(n) and i(n), and applying W(k) to Y(k) in order to equalize the desired signal, s(n), and reduce co-channel interference i(n).

8 Claims, 2 Drawing Sheets

100

200

METHOD AND APPARATUS FOR REDUCING INTERFERENCE WITHIN A COMMUNICATION SYSTEM

FIELD OF THE INVENTION

The present invention relates generally to interference suppression and in particular, to a method and apparatus for reducing interference within a communication system.

BACKGROUND OF THE INVENTION

Interference often hinders performance of communication systems. One type of interference often encountered by a user within a communication system is interference generated by the transmissions of other users. This is typically caused by many users transmitting within the same frequency band, and is referred to as co-channel interference. In order to reduce co-channel interference many communication systems employ a frequency reuse pattern, where transmitters in adjacent cells transmit on different frequencies. However, given the price of spectrum, future communications systems will be characterized by aggressive frequency reuse patterns that will result in significantly increased levels of co-channel interference.

Notwithstanding the above, more and more system operators are taking advantage of unlicensed frequency bands for transmitting information. Because the number of transmitters within an unlicensed frequency band is not restricted, there exists the potential of greatly increased co-channel interference. Additionally, because operators within the unlicensed band do not have to synchronize to a common source, typical co-channel interference is asynchronous in that the interfering signal does not align in time with the desired signal.

Because co-channel interference can greatly reduce the efficiency of a communication system, and because co-channel interference can be both synchronous and asynchronous, a need exists for a method and apparatus for reducing both synchronous and asynchronous co-channel interference within a communication system.

DETAILED DESCRIPTION OF THE DRAWINGS

In a highly frequency-selective propagation channel, the ability to accurately track the variations in the channel frequency response is critical to the proper operation of any interference suppression algorithm. The method and device of the present invention provide an improved technique for combining the outputs of the plurality of receiving antennas to suppress interference. The method and device of the present invention can be incorporated into a communications receiving device, base station, or subscriber unit. In the present invention, the term "device" can refer to any type of communications device such as a base station, subscriber unit, or other communications receiver or transmitter.

In accordance with the preferred embodiment of the present invention a method and apparatus for reducing interference within a communication system is provided herein. The method comprises the steps of receiving a signal $y(n)$, where $y(n)$ comprises a desired signal, $s(n)$, and a co-channel interfering signal, $i(n)$, wherein $s(n)$ and $i(n)$ are not time-synchronized, converting $y(n)$ into a frequency-domain signal $Y(k)$, calculating a weight vector $W(k)$, wherein $W(k)$ is based on $s(n)$ and $i(n)$, and additionally based on a time offset T existing between $s(n)$ and $i(n)$, and applying $W(k)$ to $Y(k)$ in order to equalize the desired signal, $s(n)$, and reduce co-channel interference $i(n)$. For an unsynchronized system, $W(k)$ is calculated based on a timing offsets of both the desired signal and interferer from a time reference maintained at the receiver.

Figure 1:
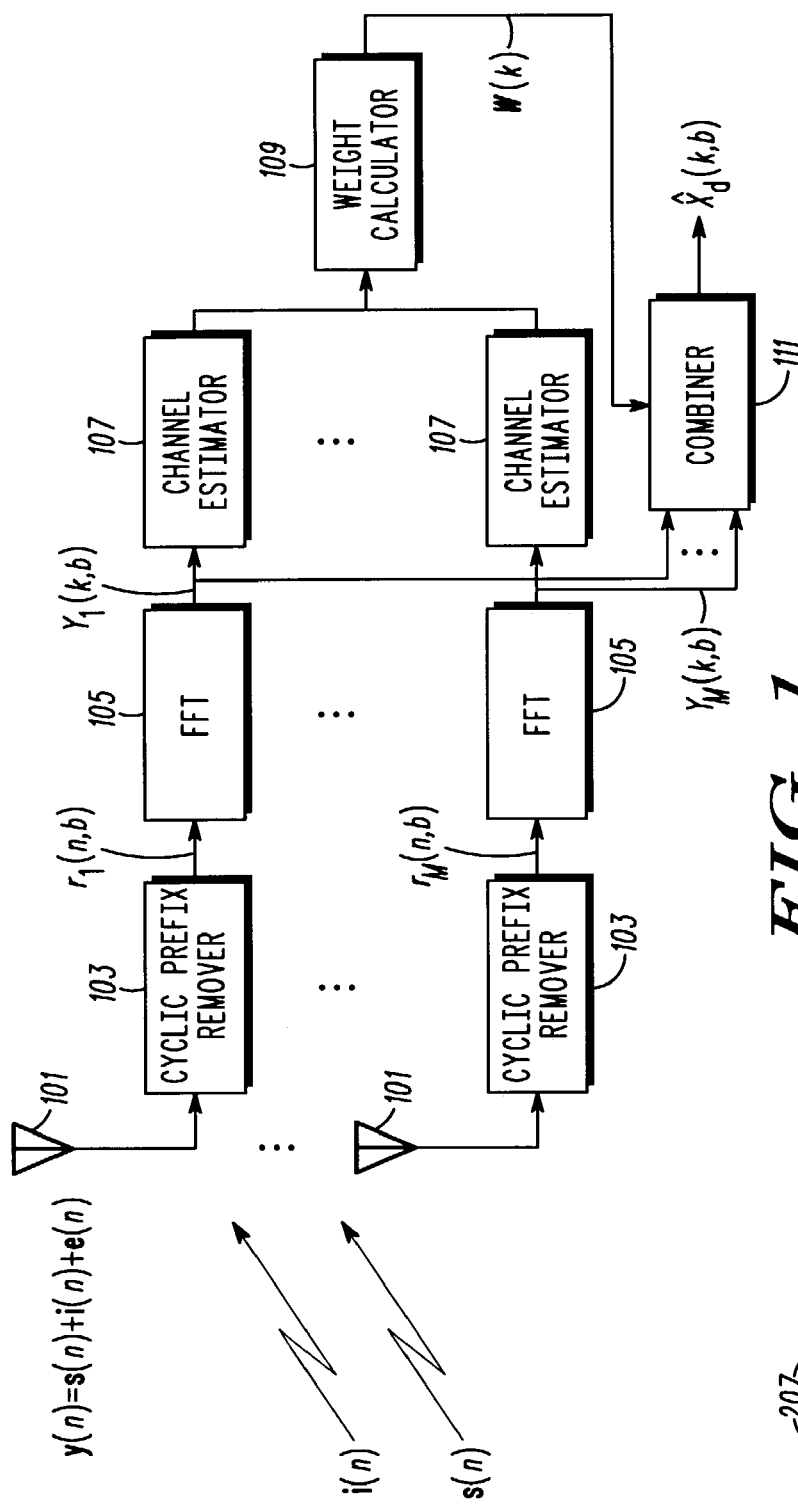
FIG. 1 is a block diagram of a receiver in accordance with the preferred embodiment of the present invention.

Turning now to the drawings, wherein like numerals designate like components, FIG. 1 is a block diagram of receiver 100 in accordance with the preferred embodiment of the present invention. Receiver 100 utilizes an OFDM communication system protocol, however in alternate embodiments of the present invention, other system protocols may be utilized as well. Such other system protocols include, but are not limited to Frequency-Domain Equalized Single-Carrier Systems having Cyclic Prefixes (called Cyclic Prefix Single Carrier), Code Division Multiple Access systems having Cyclic Prefixes (called Cyclic Prefix CDMA), multi-carrier CDMA systems, and spread-OFDM systems. As a result, the invention is applicable and effective in OFDM systems, CP-Single Carrier systems, CP-CDMA systems, and any other similar or hybrid systems. As shown, receiver 100 comprises at least one antenna 101, cyclic prefix remover 103, fast Fourier transformer (FFT) 105, and channel estimator 107. As is known in the art, the exact number of the above elements will vary depending upon the amount of channels simultaneously being received by the receiver. For simplicity, only two received signals are shown: $s(n)$ is the signal received from the desired transmitter (i.e., the transmitter whose data the receiver is trying to estimate) and $i(n)$ is the signal received from an interfering transmitter. The desired transmitter is also referred to as the desired signal or the desired user. Both $s(n)$ and $i(n)$ are the signals received from the respective transmitters after having been corrupted by their respective channels. It should be noted that in the preferred embodiment of the present invention $s(n)$ and $i(n)$ may, or may not be synchronized to a common time source.

Regardless of the number of signals simultaneously being received, receiver 100 comprises weight calculator 109 and combiner 111. In the preferred embodiment of the present invention receiver 100 is similar to the receiver described in U.S. Pat. No. 6,141,393 METHOD AND DEVICE FOR CHANNEL ESTIMATION, EQUALIZATION, AND INTERFERENCE SUPPRESSION, by Thomas et al. and incorporated by reference herein. As described in the '393 patent, it is advantageous to have a method and device that tracks the frequency response of the communication system accurately to permit effective interference suppression. In order to accomplish this task, weight calculator 109 calculates appropriate channel weights to apply to the received signal $y(n)$ in order to equalize the desired signal, $s(n)$, and reduce co-channel interference $i(n)$. However, unlike the '393 patent, both synchronous and asynchronous interferers are suppressed by the present invention receiver 100. Also unlike the '393 patent, both the synchronous and asynchronous part of the desired signal are accounted for by the present invention receiver 100 when equalizing the desired signal. A more detailed explanation of how this is accomplished is described below with reference to both FIG. 1 and FIG. 2.

Figure 2:
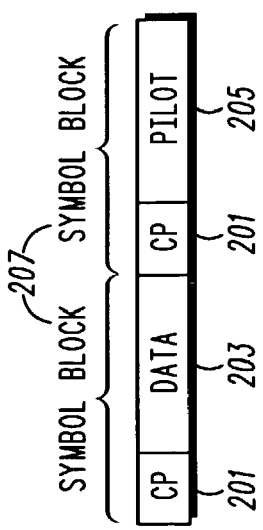
FIG. 2 illustrates a typical frame structure in accordance with the preferred embodiment of the present invention.

FIG. 2 illustrates typical frame structure 200 in accordance with the preferred embodiment of the present invention. In a preferred embodiment, a plurality of transmitting devices simultaneously transmit information to receiver 100 having a plurality of antennas 101. In the preferred embodiment of the present invention all transmitting devices transmit information in bursts that contain three components: cyclic prefix 201, data block 203, and training (pilot) sequence 205. However, in alternate embodiments, cyclic prefix 201 may be eliminated. Frame structure 200 can be divided into symbol blocks which consist of a cyclic prefix 201 of length $L_{cp}$ plus a block 203 of data symbols or a block 205 of pilot symbols each of length N. In the figure, the first symbol block, which is a block of $N+L_{cp}$ symbols, x(n,b) for $-L_{cp} \leq n \leq N-1$, and will be referred to as block b, contains only data symbols. The second symbol block (block b+1), which is another block of $N+L_{cp}$ symbols, x(n,b) for $-L_{cp} \leq n \leq N-1$, contains only pilots symbols. In the preferred embodiment, the information contained in cyclic prefix 201 comprises a repetition of the last $L_{cp}$ (where $L_{cp} \geq 0$) time-domain symbols of a symbol block. In equation form, this repetition is expressed as x(n,b)=x(n+N,b) for $-L_{cp} \leq n \leq -1$.

In other embodiments of the invention, the cyclic prefix may contain known symbols such as training symbols or null symbols. Furthermore, other embodiments may have the cyclic prefix (or null prefix, or other forms of cyclic redundancy) split between the beginning and the end of the symbol block. The desired transmitter and interferer could have cyclic prefix lengths that are different, so $L_{cp}^d$ and $L_{cp}^i$ are used to designate the lengths of the desired signal's cyclic prefix length and interferer's cyclic prefix length respectively. Both $L_{cp}^d$ and $L_{cp}^i$ can be greater than or equal to zero, where a value of zero means that no cyclic prefixes are employed. The information transmitted in training interval 205 contains pilot symbol sequences of content and duration known by both transmitting devices and receiver 100. Note that the frame structure 200 contains a block 205 of pilot symbols which are in a different symbol block 207 than the block 203 shown to contain only data symbols. In alternate embodiments data symbols that are shown to be contained in block 203 can be mixed with the pilot symbols that are shown to be contained in 205 to comprise a symbol block that comprises both pilot symbols and data symbols, where the pilot and data symbols reside in either the time or frequency domains. The desired transmitter's symbols will be designated as $x_d(n,b)$ and are what the receiver is attempting to recover. The interferer's symbols are designated $x_i(n,b)$.

During operation, the M×1 signal y(n) (where M is the number of receive antennas and n indicates the time sample index) enters at least one antenna 101. In equation form, y(n) is given as:

$$y(n) = s(n) + i(n) + e(n), \qquad (1)$$

where e(n) is a M×1 vector of receiver noise with power $\sigma_n^2$. e(n) may also contain any interfering signals not included in i(n). s(n) and i(n) are given as:

$$s(n) = \sum_{l=0}^{L_d-1} h_l^d x_d\left((n-l-T_d+L_{cp}^d)_{(N+L_{cp}^d)} - L_{cp}^d, \left\lfloor \frac{n-l-T_d+L_{cp}^d}{N+L_{cp}^d} \right\rfloor \right) \qquad (2)$$

$$i(n) = \sum_{l=0}^{L_i-1} h_l^i x_i\left((n-l-T_i+L_{cp}^i)_{(N+L_{cp}^i)} - L_{cp}^i, \left\lfloor \frac{n-l-T_i+L_{cp}^i}{N+L_{cp}^i} \right\rfloor \right) \qquad (3)$$

where $L_d$ is the length of the desired user's time-domain channel, $L_i$ is the length of the interferer's time-domain channel, $h_l^d$ ($0 \leq l \leq L_d-1$) is the M×1 time-domain channel vector at lag l for the desired user, $h_l^i$ ($0 \leq l \leq L_i-1$) is the M×1 time-domain channel vector at lag l for the interferer, $T_d$ is the timing offset for the desired user, $T_i$ is the timing offset for the interferer, $(n)_N$ means n modulus N, and $\lfloor n \rfloor$ means the largest integer less than or equal to n.

Signal y(n) comprises the desired M×1 signal s(n), all interfering signals i(n) which are also M×1, and noise e(n). y(n) is demodulated and the portion of y(n) which corresponds to the cyclic prefix portion of the desired signal s(n) at symbol time b is removed by cyclic prefix remover 103 (i.e., the receiver is synchronized to the desired signal without accounting for the offset, $T_d$), resulting in the M×1 signal, r(n,b) for $0 \leq n \leq N-1$. In equation form, r(n,b) is given as:

$$r(n,b) = \begin{bmatrix} r_1(n,b) \\ \vdots \\ r_M(n,b) \end{bmatrix} = y((b-1)(N+L_{cp}^d)+n) \text{ for } 0 \leq n \leq N-1 \qquad (4)$$

After cyclic prefix removal, the signal is transformed into a frequency-domain signal, Y(k,b) through an FFT operation 105 where k indicates the frequency (or subcarrier) index. In equation form, Y(k,b) is given as:

$$Y(k,b) = \begin{bmatrix} Y_1(k,b) \\ \vdots \\ Y_M(k,b) \end{bmatrix} = \frac{1}{\sqrt{N}} \sum_{n=0}^{N-1} r(n,b) e^{-j2\pi kn/N} \qquad (5)$$

The frequency-domain signal, Y(k,b), for the time indexes, b, corresponding to pilot intervals enters the channel estimators 107 where a channel estimation for the desired signal plus all interferers takes place. More particularly (and assuming there is only a single interferer for simplicity), the M×1 time-domain channels for the desired signal and interference, $h_l^d$ and $h_l^i$ respectively, and the respective channel lengths of the desired signal and interference, $L_d$ and $L_i$ respectively, are estimated along with an estimate of the noise power, $\sigma_n^2$, and the timing offsets for the desired signal and interference, $T_d$ and $T_i$ respectively. The time-domain channels for both the desired signal and interferer are assumed not to vary in time to simplify the calculation of the combining weights, W(k). In other embodiments, the channel estimator tracks the time variations and the combining weights change in response to the variations in the channels.

Like the received time-domain signal, y(n), the frequency-domain signal Y(k,b) can also be expressed as the sum of the desired signal, interference, and noise as follows:

$$Y(k,b)=S(k,b)+I(k,b)+E(k,b), \quad (6)$$

where:

$$S(k,b) = \frac{1}{\sqrt{N}}\sum_{n=0}^{N-1} s((b-1)(N+L_{cp}^d)+n)e^{-j2\pi kn/N} \quad (7)$$

$$I(k,b) = \frac{1}{\sqrt{N}}\sum_{n=0}^{N-1} i((b-1)(N+L_{cp}^d)+n)e^{-j2\pi kn/N} \quad (8)$$

$$E(k,b) = \frac{1}{\sqrt{N}}\sum_{n=0}^{N-1} e((b-1)(N+L_{cp}^d)+n)e^{-j2\pi kn/N} \quad (9)$$

As described in the '393 patent, weight calculator 109 calculates appropriate weights to apply to data 203 so that the desired user's frequency-domain signal, S(k,b) is equalized and the frequency-domain interference signal, I(kb), is reduced or eliminated without significantly enhancing the frequency-domain noise, E(k,b). More particularly, during training interval 205 of the desired user, the outputs of the channel estimators 107 are used to calculate the M×1 weights, W(k), as described below. Unlike the prior art, in the preferred embodiment of the present invention W(k) is calculated so that both asynchronous and synchronous interference is eliminated. This interference elimination is accomplished by proper modeling of the interferer in the frequency domain by accounting for the part of the interferer that is asynchronous and the part that is synchronous. The interference is optimally eliminated by using the proper modeling in the calculation of W(k). Also, unlike prior art, in the preferred embodiment of the present invention, W(k) is calculated so that both the asynchronous and synchronous parts of the desired signal are accounted for. By accounting for the asynchronous part of the desired signal,better combining weights, W(k), than the prior art are calculated.

During the data portion of slot 200, W(k) is applied to Y(kb) such that interference is reduced and an estimate of the desired user's frequency-domain signals are obtained. In equation form, this combining operation is given as:

$$\hat{X}_d(k,b)=W^H(k)Y(k,b), \quad (10)$$

where $^H$ is the conjugate transpose operator, $\hat{X}_d(k,b)$ is an estimate of the desired user's frequency domain symbols, $X_d(k,b)$, where $X_d(k,b)$ is the FFT of the desired user's time-domain symbols, $x_d(k,b)$, as follows:

$$X_d(k,b) = \frac{1}{\sqrt{N}}\sum_{n=0}^{N-1} x_d(n,b)e^{-j2\pi kn/N} \quad (11)$$

As described above, unlike prior-art interference suppression, in the preferred embodiment of the present invention W(k) is determined so that both asynchronous and synchronous interference is eliminated. More particularly, most existing communication systems do not try to suppress interference from other cells, but instead simply treat it as noise. By suppressing the interference, significant improvements in the system capacity can be achieved.

In a cyclic-prefix communication system, an asynchronous interferer is defined as a signal whose cyclic prefix does not line up in time with the desired signal's cyclic prefix (in other words, $T_i \neq 0$). This means that in the frequency domain, the asynchronous interferer cannot be modeled on a given sub-carrier as the interferer's channel on that sub-carrier multiplied by a data symbol. Therefore an accurate model of the frequency-domain asynchronous interferer's signal is needed. Additionally if $T_d \neq 0$ or $L_{cp}^d > L_d$, an accurate model of the desired signal's frequency-domain signal is needed. For the analysis that follows, it is assumed that $0 \leq T^d \leq N - L_{cp}^d$ and $0 \leq T_i \leq N - L_{cp}^i$. In order to simplify the analysis that follows, it is assumed that b=0. The received M×1 time-domain signals (M is the number of receive antennas) for the desired user and the interferer are given as (only for the above assumptions and 0<n<N−1):

$$\tilde{s}(n) = \sum_{l=0}^{L_d-1} h_l^d z_d(n-l-T_d) \quad (12)$$

$$\tilde{i}(n) = \sum_{l=0}^{L_i-1} h_l^i z_i(n-l-T_i) \quad (13)$$

where the '~' is used to indicate that these signals are different from s(n) and i(n) in that they are only defined for $0 \leq n \leq N-1$. $Z_d(n)$ and $z_i(n)$ are used to simplify the analysis and are given as:

$$z_d(n) = \begin{cases} x_d(n,0) & \text{for } n \geq -L_{cp}^d \\ x_d(n,-1) & \text{for } n < -L_{cp}^d \end{cases} \quad (14)$$

$$z_i(n) = \begin{cases} x_i(n,0) & \text{for } n \geq -L_{cp}^i \\ x_i(n,-1) & \text{for } n < -L_{cp}^i \end{cases} \quad (15)$$

Note that both the desired signal and the interferer have cyclic prefixes inserted so that $z_d(n)=z_d(n+N)$ for $-L_{cp}^d \leq n \leq -1$ and $z_i(n)=z_i(n+N)$ $-L_{cp}^i \leq n \leq -1$.

Although the analysis assumes that both the desired signal and the interfering signal have cyclic prefixes, the analysis also holds for signals with no cyclic prefix as will be discussed below. The received signals can be shown to be:

$$\tilde{s}(n) = \sum_{l=0}^{\max(L_{cp}^d+1-T_d,0)-1} h_l^d z_d(n-l-T_d) + \quad (16)$$

$$\sum_{l=\max(L_{cp}^d+1-T_d,0)}^{L_d-1} h_l^d z_d(n-l-T_d)$$

$$\tilde{i}(n) = \sum_{l=0}^{\max(L_{cp}^i+1-T_i,0)-1} h_l^i z_i(n-l-T_i) + \quad (17)$$

$$\sum_{l=\max(L_{cp}^i+1-T_i,0)}^{L_i-1} h_l^i z_i(n-l-T_i)$$

The first term in (16) and (17) represents the synchronous portion of the signals and the second term in (16) and (17)

corresponds to the asynchronous part. Note that if $T_d$ ($T_i$) is large enough, the synchronous portion of the desired signal (interferer) will be zero. For desired signals (interferers) with no cyclic prefixes, only the asynchronous portion is present and $T_d(T_i)$ is set to $L_{cp}^d+1(L_{cp}^i+1)$.

The N-point FFT of $\tilde{s}(n)$ and $\tilde{i}(n)$ is:

$$\tilde{S}(k) = \frac{1}{\sqrt{N}} \sum_{n=0}^{N-1} \tilde{s}(n) e^{-j2\pi kn/N} \tag{18}$$

$$\tilde{I}(k) = \frac{1}{\sqrt{N}} \sum_{n=0}^{N-1} \tilde{i}(n) e^{-j2\pi kn/N} \tag{19}$$

By substituting (16) into (18) and (17) into (19) and simplifying, $\tilde{S}(k)$ and $\tilde{I}(k)$ can be shown to be:

$$\tilde{S}(k) = e^{-j2\pi k T_d/N} H_s^d(k) Z_d(k) + \frac{1}{\sqrt{N}} \sum_{n=0}^{N-1} \sum_{l=\max(L_{cp}^d+1-T_d,0)}^{L_d-1} h_l^d z_d(n-l-T_d) e^{-j2\pi kn/N}, \tag{20}$$

$$\tilde{I}(k) = e^{-j2\pi k T_i/N} H_s^i(k) Z_i(k) + \frac{1}{\sqrt{N}} \sum_{n=0}^{N-1} \sum_{l=\max(L_{cp}^d+1-T_i,0)}^{L_i-1} h_l^i z_i(n-l-T_i) e^{-j2\pi kn/N}, \tag{21}$$

where:
$H_s^d(k)$ and $H_s^i(k)$ are the FFT of the synchronous part of the desired user's channel and interferer's channel respectively, where;

$$H_s^d(k) = \sum_{l=0}^{\max(L_{cp}^d+1-T_d,0)-1} h_l^d e^{-j2\pi kl/N} \tag{22}$$

$$H_s^i(k) = \sum_{l=0}^{\max(L_{cp}^i+1-T_i,0)-1} h_l^i e^{-j2\pi kl/N} \tag{23}$$

$h_l^d$ is the desired user's time-domain channel;
$h_l^i$ is the interferer's time-domain channel; and
$Z_d(k)$ and $Z_i(k)$ are the FFT of the desired user's time-domain symbols and the interferer's time-domain symbols respectively, where $$Z_d(k) = \frac{1}{\sqrt{N}} \sum_{n=0}^{N-1} z_d(n) e^{-j2\pi kn/N} \tag{24}$$

$$Z_i(k) = \frac{1}{\sqrt{N}} \sum_{n=0}^{N-1} z_i(n) e^{-j2\pi kn/N}. \tag{25}$$

Note that $H_s^d(k)$ ($H_s^i(k)$) can be zero if the desired signal (interferer) is completely asynchronous. Also note that the $1/\sqrt{N}$ is not present in the definition of $H_s^d(k)$ and $H_s^i(k)$.

The minimum mean square error (MMSE) combining weights W(k) require the spatial correlation matrix of the desired user on subcarrier k, $R_d(k)$, the spatial correlation matrix of the interferer on subcarrier k, $R_I(k)$, and the spatial correlation matrix of the noise, $R_E(k)$ (typically, $R_E(k)$ $=\sigma_n^2 I_M$ where $I_M$ is an M×M identity matrix). The combining weights, W(k), are found as the solution to the following equation:

$$W(k) = \arg\min\{Ex(W(k)^H Y(k,b) - X_d(k,b))\} \tag{26}$$

where Ex( ) is the expectation operator. The solution for W(k) can be shown to be:

$$W(k) = (R_d(k) + R_I(k) + R_E(k))^{-1} p(k) \tag{27}$$

where the M×1 crosscorrelation vector, p(k), and the spatial correlation matrixes for the desired user and interferer are:

$$p(k) = Ex\{\tilde{S}(k) X^*(k,b)\} = Ex\{\tilde{S}(k) Z^*_d(k)\} \tag{28}$$

$$R_d(k) = Ex\{\tilde{S}(k) \tilde{S}^H(k)\} \tag{29}$$

$$R_I(k) = Ex\{\tilde{I}(k) \tilde{I}^H(k)\} \tag{30}$$

Note that the combining weights, W(k), in equation (27) assume that an interferer is present. The present invention can also improve on the equalization abilities of prior art by accounting for both the asynchronous and synchronous portions of the desired signal when no interferer is present. Unlike the prior art, in the preferred embodiment of the present invention, W(k) is calculated so that both the asynchronous and synchronous components of the desired user's frequency-domain signal is accounted for when equalizing the received signal when no interfering signal is present. For the case of no interference, the combining weights are given as:

$$W(k) = (R_d(k) + R_E(k))^{-1} p(k) \tag{31}$$

In order to determine p(k), $R_d(k)$, and $R_I(k)$, $\tilde{S}(k)$ and $\tilde{I}(k)$ will be broken up into a synchronous part, $S_s(k)$ and $I_s(k)$ respectively, and an asynchronous part, $S_a(k)$ and $I_a(k)$ respectively, as follows:

$$\tilde{S}(k) = S_s(k) + S_a(k), \tag{32}$$

$$\tilde{I}(k) = I_s(k) + I_a(k), \tag{33}$$

where:

$$S_s(k) = e^{-j2\pi k T_d/N} H_s^d(k) Z_d(k), \tag{34}$$

$$S_s(k) = e^{-j2\pi k T_i/N} H_s^i(k) Z_i(k), \tag{35}$$

$$S_a(k) = \frac{1}{\sqrt{N}} \sum_{n=0}^{N-1} \sum_{l=\max(L_{cp}^d+1-T_d,0)}^{L_d-1} h_l^d z_d(n-l-T_d) e^{-j2\pi kn/N}. \tag{36}$$

$$I_a(k) = \frac{1}{\sqrt{N}} \sum_{n=0}^{N-1} \sum_{l=\max(L_{cp}^i+1-T_i,0)}^{L_i-1} h_l^i z_i(n-l-T_i) e^{-j2\pi kn/N}. \tag{37}$$

p(k) can be expressed in terms of $S_s(k)$ and $S_a(k)$ as follows:

$$p(k) = Ex\{S_s(k) Z^*_d(k)\} + Ex\{S_a(k) Z^*_d(k)\} \tag{38}$$

$R_d(k)$ can now be expressed in terms of $S_s(k)$ and $S_a(k)$ as follows:

$$R_d(k) = Ex\{S_s^H(k) S_s^H(k)\} + Ex\{S_a(k) S_a^H(k)\} + Ex\{S_s(k) S_a^H(k)\} + Ex\{S_a(k) S_s^H(k)\} \tag{39}$$

$R_I(k)$ can now be expressed in terms of $I_s(k)$ and $I_a(k)$ as follows:

$$R_I(k) = Ex\{I_s^H(k) I_s^H(k)\} + Ex\{I_a(k) I_a^H(k)\} + Ex\{I_s(k) I_a^H(k)\} + Ex\{I_a(k) I_s^H(k)\} \tag{40}$$

In order to evaluate the terms in (38), (39), and (40), the correlation between time-domain symbols for the desired user and interferer, $R_{zz}^d(n,m)$ and $R_{zz}^i(n,m)$ respectively, the correlation between frequency-domain symbols for the desired user and interferer, $R_{ZZ}^d(k)$ and $R_{ZZ}^i(k)$ respectively, and the cross-correlation between the frequency-domain and time-domain symbols for the desired user and interferer, $R_{Zz}^d(k,m)$ and $R_{Zz}^i(k,m)$ respectively, must be defined. These correlations will depend on the type of modulation used (e.g., OFDM or single carrier). These correlation functions are defined as:

$$R_{zz}^d(n,m) = Ex\{z_d^*(n)z_d(m)\} \tag{41}$$

$$R_{ZZ}^d(k) = Ex\{Z_d^*(k)Z_d(k)\} \tag{42}$$

$$R_{Zz}^d(k,m) = Ex\{Z_d^*(k)z_d(m)\} \tag{43}$$

$$R_{zz}^i(n,m) = Ex\{z_i^*(n)z_i(m)\} \tag{44}$$

$$R_{ZZ}^i(k) = Ex\{Z_i^*(k)Z_i(k)\} \tag{45}$$

$$R_{Zz}^i(k,m) = Ex\{Z_i^*(k)z_i(m)\} \tag{46}$$

The cross-correlation between the frequency-domain and time-domain symbols can be expressed in terms of the correlation between time-domain symbols as follows:

$$R_{Zz}^d(k,m) = Ex\left\{\frac{1}{\sqrt{N}}\sum_{n=0}^{N-1}z_d^*(n)e^{j2\pi kn/N}z_d(m)\right\} \tag{47}$$

$$= \frac{1}{\sqrt{N}}\sum_{n=0}^{N-1}R_{zz}^d(n,m)e^{j2\pi kn/N}$$

$$R_{Zz}^i(k,m) = Ex\left\{\frac{1}{\sqrt{N}}\sum_{n=0}^{N-1}z_i^*(n)e^{j2\pi kn/N}z_i(m)\right\} \tag{48}$$

$$= \frac{1}{\sqrt{N}}\sum_{n=0}^{N-1}R_{zz}^i(n,m)e^{j2\pi kn/N}$$

Using the correlation functions, the different terms in (38), (39), and (40) can be shown to be:

$$Ex\{S_s(k)Z_d^*(k)\} = e^{-j2\pi kT_d/N}H_s^d(k) \tag{49}$$

$$Ex\{S_a(k)Z_d^*(k)\} = \tag{50}$$

$$\frac{1}{\sqrt{N}}\sum_{n=0}^{N-1}\sum_{l=\max(0,L_{cp}^d+1-T_d)}^{L_d-1} h_l^d R_{Zz}^d(k, n-l-T_d)e^{-j2\pi kn/N}$$

$$Ex\{S_s(k)S_s^H(k)\} = H_s^d(k)(H_s^d(k))^H R_{ZZ}^d(k) \tag{51}$$

$$Ex\{S_a(k)S_s^H(k)\} = \tag{52}$$

$$\frac{1}{\sqrt{N}}e^{j2\pi kT_d/N}\left(\sum_{n=0}^{N-1}\sum_{l=\max(0,L_{cp}^d+1-T_i)}^{L_d-1} h_l^d R_{Zz}^d(k, n-l-T_d)e^{-j2\pi kn/N}\right)$$

$$(H_s^d(k))^H$$

$$Ex\{S_s(k)S_a^H(k)\} = (Ex\{S_a(k)S_s^H(k)\})^H \tag{53}$$

$$Ex\{S_a(k)S_a^H(k)\} = \tag{54}$$

$$\frac{1}{N}\sum_{n=0}^{N-1}\sum_{m=0}^{N-1}\sum_{l=\max(L_{cp}^d+1-T_d,0)}^{L_d-1}\sum_{p=\max(L_{cp}^d+1-T_d,0)}^{L_d-1} h_p^d(h_l^d)^H$$

$$R_{zz}^d(n-l-T_d, m-p-T_d)e^{j2\pi k(m-n)/N}$$

$$Ex\{I_s(k)I_s^H(k)\} = H_s^i(k)(H_s^i(k))^H R_{ZZ}^i(k) \tag{55}$$

$$Ex\{I_a(k)I_s^H(k)\} = \tag{56}$$

$$\left(\frac{1}{\sqrt{N}}e^{j2\pi kT_i/N}\sum_{n=0}^{N-1}\sum_{l=\max(0,L_{cp}^i+1-T_i)}^{L_i-1} h_l^i R_{Zz}^i(k, n-l-T_i)e^{-j2\pi kn/N}\right)$$

$$(H_s^i(k))^H$$

$$Ex\{I_s(k)I_a^H(k)\} = (Ex\{I_a(k)I_s^H(k)\})^H \tag{57}$$

$$Ex\{I_a(k)I_a^H(k)\} = \tag{58}$$

$$\frac{1}{N}\sum_{n=0}^{N-1}\sum_{m=0}^{N-1}\sum_{l=\max(L_{cp}^i+1-T_i,0)}^{L_i-1}\sum_{p=\max(L_{cp}^i+1-T_i,0)}^{L_i-1} h_p^i(h_l^i)^H R_{zz}^i$$

$$(n-l-T_i, m-p-T_i)e^{j2\pi k(m-n)/N}$$

Typical assumptions for the desired user's correlation functions are the following:

$$R_{zz}^d(n,m) = Ex\{z_d^*(n)z_d(m)\} = \delta(n-m) \tag{59}$$

$$R_{ZZ}^d(k) = E\{Z_d^*(k)Z_d(k)\} = 1 \tag{60}$$

where:

$$\delta(n) = \begin{cases} 1 & \text{for } n = 0 \\ 0 & \text{otherwise} \end{cases} \tag{61}$$

The correlation in (59) does not account for the correlation between the cyclic prefix and the last symbols in a block since this correlation is only used for the asynchronous portion of the desired user.

Typical assumptions for the interferer's correlation functions are the following:

$$R_{zz}^i(n,m) = Ex\{z_i^*(n)z_i(m)\} = \delta(n-m) \tag{62}$$

$$R_{ZZ\_hu\_i}(k) = Ex\{Z_i^*(k)Z_i(k)\} = 1 \tag{63}$$

where:

$$\delta(n) = \begin{cases} 1 & \text{for } n = 0 \\ 0 & \text{otherwise} \end{cases}. \tag{64}$$

The correlation in (62) does not account for the correlation between the cyclic prefix and the last symbols in a block since this correlation is only used for the asynchronous portion of the interferer.

Using the assumptions in (59) and (60), p(k) can be shown to be:

$$p(k) = e^{-j2\pi k T_d/N} \left[ H_s^d(k) + \frac{1}{N} \sum_{l=\max(0, L_{cp}^d+1-T_d)}^{L_d-1} (N - T_d - l) h_l^d e^{-j2\pi kl/N} \right] \quad (65)$$

Using the assumptions in (59) and (60), $R_d(k)$ can be shown to be:

$$R_d(k) = H_s^d(k)(H_s^d(k))^H + H_a^d(k)(H_a^d(k))^H - R_c^d(k) - (R_c^d(k))^H + R_x^d(k) + (R_x^d(k))^H \quad (66)$$

where $M \times 1$ $H_a^d(k)$, $M \times M$ $R_c^d(k)$, and $M \times M$ $R_x^d(k)$ are given as:

$$H_a^d(k) = \sum_{l=\max(L_{cp}^d+1-T_d,0)}^{L_d-1} h_l^d e^{-j2\pi kl/N} \quad (67)$$

$$R_c^d(k) = \frac{1}{N} \sum_{n=0}^{L_d-2} \sum_{p=\max(L_{cp}^d+1-T_d,0)}^{L_d-1} \sum_{l=\max(L_{cp}^d+1-T_d,p+n+1)}^{L_d-1} h_l^d (h_p^d)^H e^{-j2\pi k(l-p)/N} \quad (68)$$

$$R_x^d(k) = \frac{1}{N} H_s^d(k) \sum_{l=\max(L_{cp}^d+1-T_d,0)}^{L_d-1} \max(0, N - T_d - l + L_{cp}^d)(h_l^d)^H e^{j2\pi kl/N} \quad (69)$$

The term $R_x^d(k)$ is necessary to account for the cross-correlation between the synchronous part and asynchronous part of (20).

Using the assumptions in (62) and (63), $R_I(k)$ can be shown to be:

$$R_I(k) = H_s^i(k)(H_s^i(k))^H + H_a^i(k)(H_a^i(k))^H - R_c^i(k) - (R_c^i(k))^H + R_x^i(k) + (R_x^i(k))^H \quad (70)$$

where $M \times 1$ $H_a^i(k)$, $M \times M$ $R_c^i(k)$, and $M \times M$ $R_x^i(k)$ are given as:

$$H_a^i(k) = \sum_{l=\max(L_{cp}^i+1-T_i,0)}^{L_i-1} h_l^i e^{-j2\pi kl/N} \quad (71)$$

$$R_c^i(k) = \frac{1}{N} \sum_{n=0}^{L_i-2} \sum_{p=\max(L_{cp}^i+1-T_i,0)}^{L_i-1} \sum_{l=\max(L_{cp}^i+1-T_i,p+n+1)}^{L_i-1} h_l^i (h_p^i)^H e^{-j2\pi k(l-p)/N} \quad (72)$$

$$R_x^i(k) = \frac{1}{N} H_s^i(k) \sum_{l=\max(L_{cp}^i+1-T_i,0)}^{L_i-1} \max(0, N - T_i - l + L_{cp}^i)(h_l^i)^H e^{j2\pi kl/N} \quad (73)$$

The term $R_x^i(k)$ is necessary to account for the cross-correlation between the synchronous part and asynchronous part of (21). It should be noted that unlike the prior art, both $R_d(k)$ and $R_I(k)$ contain both an asynchronous and a synchronous component to the equation. Additionally $R_d(k)$ contains a cross-correlation between the asynchronous and the synchronous desired frequency domain signal, with $R_I(k)$ containing a crosscorrelation between the asynchronous and the synchronous frequency domain interference signal.

Figure 3:
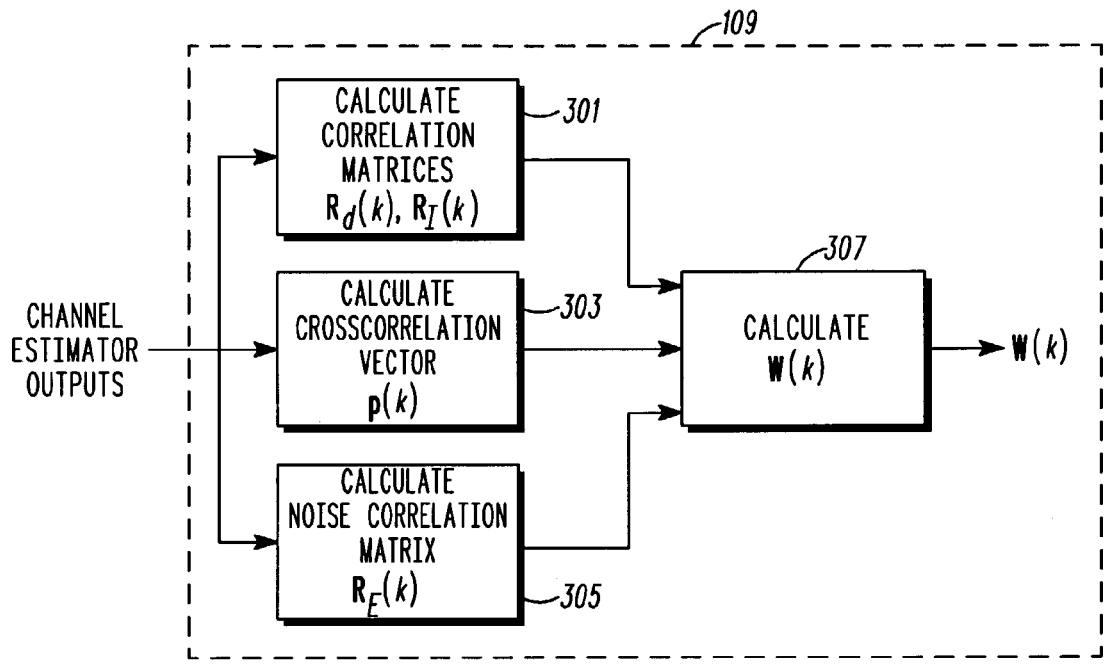
FIG. 3 is a block diagram of the weight calculator of FIG. 1 in accordance with the preferred embodiment of the present invention.

FIG. 3 is a block diagram of weight calculator 109 of FIG. 1 in accordance with the preferred embodiment of the present invention. As shown, weight calculator 109 comprises logic circuitry 301, used to calculate correlation matrices $R_d(k)$ and $R_I(k)$, logic circuitry 303 utilized to calculate the crosscorrelation matrix p(k), and logic circuitry 305 utilized to calculate noise correlation matrix $R_E(k)$, and logic circuitry 307 used to calculate W(k).

Figure 4:
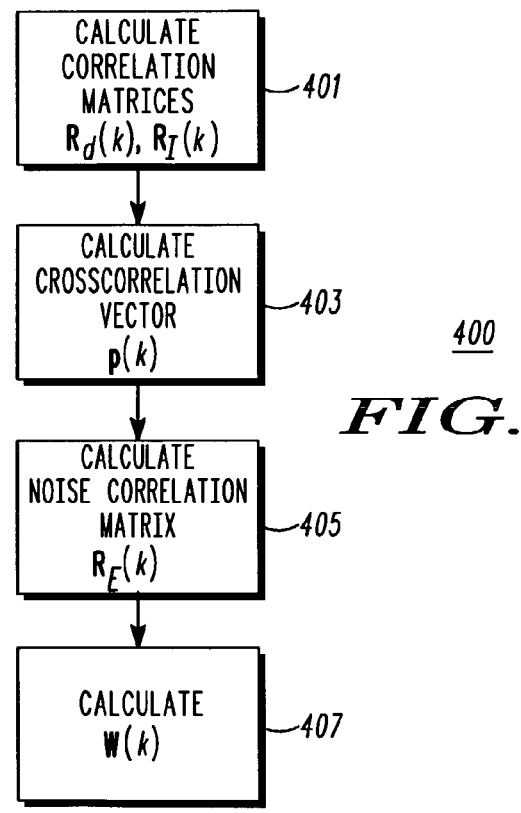
FIG. 4 is a flow chart showing operation of the receiver of FIG. 1 in accordance with the preferred embodiment of the present invention.

Operation of weight calculator 109 in accordance with the preferred embodiment of the present invention occurs as shown in FIG. 4. The logic flow begins at step 401 where logic circuitry 301 calculates spatial correlation matrix of the desired user on subcarrier k($R_d(k)$), and the spatial correlation matrix of the interferer on subcarrier k($R_I(k)$). As discussed above, $R_d(k)$ is defined in equation (66) above, and is based on the desired user's synchronous frequency-domain channel, $H_s^d(k)$, the desired user's asynchronous frequency-domain channel, $H_a^d(k)$, the desired user's correction matrix, $R_c^d(k)$, and the desired user's crosscorrelation matrix, $R_x^d(k)$. Unlike prior art, in the preferred embodiment the asynchronous part of the desired user is considered along with the synchronous portion when computing the MMSE combining weights, W(k). Additionally $R_I(k)$ is defined in equation (70) above, and is based on the interferer's synchronous frequency-domain channel, $H_s^i(k)$, the interferer's asynchronous frequency-domain channel, $H_a^i(k)$, the interferer's correction matrix, $R_c^i(k)$, and the interferer's crosscorrelation matrix, $R_x^i(k)$. Unlike the prior art, in the preferred embodiment the asynchronous part of the interfering signal along with the synchronous portion is considered when computing the MMSE combining weights, W(k).

Continuing, at step 403 p(k) is calculated. p(k) is defined in equation (65) and is based on the timing offset for the desired user, $T_d$, the synchronous part of the desired user's frequency-domain channel, $H_s^d(k)$, and the desired user's time-domain channel at all lags, l, $h_l^d$. Unlike prior art, in the preferred embodiment we take into account the asynchronous portion of the desired signal (if present) when computing the MMSE combining weights, W(k).

Continuing, at step 405 the spatial correlation matrix of the noise, $R_E(k)$ (typically, $R_E(k) = \sigma_n^2 I_M$ where $I_M$ is an $M \times M$ identity matrix) is calculated. As discussed above, in the preferred embodiment, $R_E(k)$ is based only on the noise power, $\sigma_n^2$.

Finally, at step 409 W(k) is calculated. As discussed above, $W(k) = (R_d(k) + R_I(k) + R_E(k))^{-1} p(k)$. Because W(k) is based both on synchronous and asynchronous co-channel interference, the reduction of co-channel interference is greatly reduced and the efficiency and reliability of the communication system is increased.

While the invention has been particularly shown and described with reference to a particular embodiment, it will be understood by those skilled in the art that various changes in form and details may be made therein without departing from the spirit and scope of the invention. For example, the above description detailed the case where there are multiple interfering devices, in which case each transmitting source is modeled according to equation (3). Utilization of the above-techniques are also applicable to the case where an interfering transmitter has more than one transmit antenna, in which case each additional transmit antenna on a transmitting device is modeled according to equation (3). The above description is also applicable to the case where there are multiple desired transmitting devices, which is the Spatial Division Multiple Access, or SDMA, scenario. The above techniques are also applicable to the case where the desired user transmits with multiple transmitting antennas in a spatial multiplexing manner, which is the Multiple Input Multiple Output, or MIMO, scenario. Alternate embodiments of the present invention can therefore be applied to MIMO, SDMA, or combinations of both MIMO and SDMA. In the MIMO or SDMA cases, multiple combining weights can be formed, one for each incident desired signal. When computing the combining weights for one of the incident desired signals, all other incident signals can be treated as interference, regardless of whether those signals originated from multiple desired devices (the SDMA case) or from other signals transmitted from a co-located transmit antenna (the MIMO case). It is intended that such changes come within the scope of the following claims.

The invention claimed is:

1. An apparatus for reducing interference within a communication system, the apparatus comprising:
    an antenna receiving a signal $y(n)$, where $y(n)$ comprises a desired signal, $s(n)$, and a co-channel interfering signal, $i(n)$, wherein $s(n)$ and $i(n)$ are not time-synchronized;
    a transformer for transforming $y(n)$ into a frequency-domain signal $Y(k)$;
    a weight calculator outputting a weight vector $W(k)$, wherein $W(k)$ is based on $s(n)$ and $i(n)$, and additionally based on a time offset T existing between $s(n)$ and $i(n)$; and
    a signal combiner applying $W(k)$ to $Y(k)$ in order to reduce co-channel interference $i(n)$, wherein $W(k)$ is additionally based on a spatial correlation matrix of the desired signal on a subcarrier k, $R_d(k)$, wherein $W(k)$ is additionally based on a spatial correlation matrix of the interferer on subcarrier k, $R_I(k)$, wherein $W(k)$ is additionally based on a spatial correlation matrix of noise, $R_E(k)$, and wherein $W(k)=(R_d(k)+R_I(k)+R_E(k))^{-1}p(k)$, wherein $p(k)$ is an M×1 crosscorrelation vector.

2. The apparatus of claim 1 wherein the weight calculator further comprises:
    logic circuitry utilized to calculate correlation matrices $R_d(k)$ and $R_I(k)$;
    logic circuitry utilized to calculate the crosscorrelation matrix $p(k)$;
    logic circuitry utilized to calculate noise correlation matrix $R_E(k)$; and
    logic circuitry used to calculate $W(k)$.

3. An apparatus comprising:
    logic circuitry utilized to calculate a spatial correlation matrix of a desired signal on a sub carrier k, $R_d(k)$;
    logic circuitry utilized to calculate a spatial correlation matrix of an interferer on the subcarrier k, $R_I(k)$;
    logic circuitry utilized to calculate on a spatial correlation matrix of noise, $R_E(k)$; and
    logic circuitry used to calculate a weighting vector $W(k)$ to be applied to a received signal, the weighting vector $W(k)$ being based on $R_d(k)$, $R_I(k)$, and $R_E(k)$, wherein $W(k)=(R_d(k)+R_I(k)+R_E(k))^{-1}p(k)$, wherein $p(k)$ is an M×1 crosscorrelation vector.

4. A method for reducing interference within a communication system, the method comprising the steps of:
    calculating a spatial correlation matrix of the desired signal on subcarrier k, $R_d(k)$;
    calculating a spatial correlation matrix of the interferer on subcarrier k, $R_I(k)$;
    calculating a spatial correlation matrix of the noise, $R_E(k)$; and
    calculating a weighting vector $W(k)$ to be applied to a received signal to reduce interference, the weighting vector $W(k)$ being based on $R_d(k)$, $R_I(k)$, and $R_E(k)$), wherein $W(k)=(R_d(k)+R_I(k)+R_E(k))^{-1}p(k)$, wherein $p(k)$ is an M×1 crosscorrelation vector.

5. A method for reducing interference within a communication system, the method comprising the steps of:
    receiving a signal $y(n)$, where $y(n)$ comprises a desired signal, $s(n)$, and a co-channel interfering signal, $i(n)$, wherein $s(n)$ and $i(n)$ are not time-synchronized;
    converting $y(n)$ into a frequency-domain signal $Y(k)$;
    calculating a weight vector $W(k)$, wherein $W(k)$ is based on $s(n)$ and $i(n)$, and additionally based on a time offset T existing between $s(n)$ and $i(n)$; and
    applying $W(k)$ to $Y(k)$ in order to reduce co-channel interference $i(n)$, wherein the step of calculating $W(k)$ comprises the step of calculating $W(k)$ based on a spatial correlation matrix of the desired signal on a subcarrier k, $R_d(k)$, wherein the step of calculating the weight vector $W(k)$ comprises the step of calculating $W(k)=(R_d(k)+R_E(k))^{-1}p(k)$, wherein $p(k)$ is an M×1 crosscorrelation vector.

6. The method of claim 5 the step of calculating $W(k)$ comprises the step of calculating $W(k)$ based on a spatial correlation matrix of noise, $R_E(k)$.

7. A method for reducing interference within a communication system, the method comprising the steps of:
    receiving a signal $y(n)$, where $y(n)$ comprises a desired signal, $s(n)$, and a co-channel interfering signal, $i(n)$, wherein $s(n)$ and $i(n)$ are not time-synchronized;
    converting $y(n)$ into a frequency-domain signal $Y(k)$;
    calculating a weight vector $W(k)$, wherein $W(k)$ is based on $s(n)$ and $i(n)$, and additionally based on a time offset T existing between $s(n)$ and $i(n)$; and
    applying $W(k)$ to $Y(k)$ in order to reduce co-channel interference $i(n)$, wherein the step of calculating $W(k)$ comprises the step of calculating $W(k)$ based on a spatial correlation matrix of the desired signal on a subcarrier k, wherein the step of calculating $W(k)$ comprises the step of calculating $W(k)=(R_d(k)+R_I(k)+R_E(k))^{-1}p(k)$, wherein $p(k)$ is an M×1 crosscorrelation vector.

8. The method of claim 7 wherein the step of calculating $W(k)$ comprises the step of calculating $W(k)$ based on a spatial correlation matrix of the interferer on subcarrier k, $R_I(k)$.

* * * * *